(12) United States Patent
Chand

(10) Patent No.: US 7,881,812 B2
(45) Date of Patent: Feb. 1, 2011

(54) EDITING AND CONFIGURING DEVICE

(75) Inventor: Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 68 days.

(21) Appl. No.: 11/238,608

(22) Filed: Sep. 29, 2005

(65) Prior Publication Data
US 2007/0073426 A1    Mar. 29, 2007

(51) Int. Cl.
G05B 19/42 (2006.01)
G05B 19/18 (2006.01)
G05B 11/01 (2006.01)

(52) U.S. Cl. ............ 700/23; 700/2; 700/3; 700/8; 700/9; 700/11; 700/18; 700/20; 700/86

(58) Field of Classification Search ........... 700/3, 700/9, 8, 2, 11, 20, 18, 86, 23
See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,858,101 A * | 8/1989 | Stewart et al. | 700/2 |
| 4,876,664 A * | 10/1989 | Bittorf et al. | 700/2 |
| 4,990,838 A | 2/1991 | Kawato et al. | |
| 5,072,374 A | 12/1991 | Sexton et al. | |
| 5,185,708 A | 2/1993 | Hall et al. | |
| 5,193,189 A * | 3/1993 | Flood et al. | 718/103 |
| 5,253,184 A | 10/1993 | Kleinschnitz | |
| 5,301,320 A * | 4/1994 | McAtee et al. | 705/9 |
| 5,446,868 A | 8/1995 | Gardea et al. | |
| 5,455,775 A | 10/1995 | Huber et al. | |
| 5,485,620 A * | 1/1996 | Sadre et al. | 717/162 |
| 5,504,891 A | 4/1996 | Motoyama et al. | |
| 5,537,585 A | 7/1996 | Blickenstaff et al. | |
| 5,572,731 A | 11/1996 | Morel et al. | |
| 5,611,059 A | 3/1997 | Benton et al. | |
| 5,619,724 A | 4/1997 | Moore | |
| 5,634,048 A | 5/1997 | Ryu et al. | |
| 5,644,740 A | 7/1997 | Kiuchi | |
| 5,675,748 A | 10/1997 | Ross | |
| 5,715,413 A | 2/1998 | Ishai et al. | |
| 5,721,905 A | 2/1998 | Elixmann et al. | |
| 5,761,499 A | 6/1998 | Sonderegger | |
| 5,797,137 A | 8/1998 | Golshani et al. | |

(Continued)

OTHER PUBLICATIONS

Pro-Set 200 RSView Design Manual; 171 pages; Nov. 2002.*

(Continued)

*Primary Examiner*—Ronald D Hartman, Jr.
(74) *Attorney, Agent, or Firm*—Turoey & Watson LLP; William R. Walbrun; John M. Miller

(57) ABSTRACT

The claimed subject matter provides an editor system for employment in an industrial automation environment that enhances programmability of at least one of a controller and an industrial process. An interface component can facilitate the receipt of instructions relating to programming a programmable logic controller. A programming assist component communicatively coupled to the interface component can program the programmable logic controller in accordance with the received instructions; the programmable logic controller is programmed in accordance with a hierarchically structured data model that utilizes a naming convention.

21 Claims, 11 Drawing Sheets

U.S. PATENT DOCUMENTS

| | | | |
|---|---|---|---|
| 5,801,942 A * | 9/1998 | Nixon et al. .................. 700/83 |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,157,864 A * | 12/2000 | Schwenke et al. ............. 700/79 |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,556,950 B1 * | 4/2003 | Schwenke et al. ........... 702/183 |
| 6,618,856 B2 * | 9/2003 | Coburn et al. ............... 717/135 |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,745,254 B2 * | 6/2004 | Boggs et al. .................. 710/11 |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,850,808 B2 * | 2/2005 | Yuen et al. .................... 700/86 |
| 6,853,920 B2 | 2/2005 | Hsiung et al. |
| 6,865,509 B1 | 3/2005 | Hsiung et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 6,981,226 B2 * | 12/2005 | Schmitt et al. ............... 715/764 |
| 7,000,191 B2 * | 2/2006 | Schmitt et al. ............... 715/764 |
| 7,010,368 B2 * | 3/2006 | Otani et al. .................... 700/86 |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0194577 A1 | 12/2002 | Connor et al. |
| 2003/0014387 A1 | 1/2003 | Kreidler et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0167790 A1 | 8/2004 | Grasse |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2005/0005289 A1 | 1/2005 | Adolph et al. |

| | | |
|---|---|---|
| 2005/0044112 A1 | 2/2005 | Yamamoto et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0091510 A1* | 4/2005 | McKeon et al. ............ 713/185 |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |

OTHER PUBLICATIONS

S95 Standard; 1 page definition printed from Internet on Aug. 21, 2009.*
SoftLogix5800 Controller Starter Kit, Quick Start Manual; 146 pages; Aug. 2001.*
RSLogix Automation Interface, Reference Manual; 232 pages; circa 2002.*
Enterprise Controls Technical Data; 4 pages; circa 2003.*
Pitzek et al., Configuration and Management of a Rest-Time Smart Transducer Network, 2003 IEEE, 2003, 4 pages.
European Search Report dated Jun. 12, 2005 for European Patent Application Serial No. EP05016793, 3 pages.
John Kubiatowicz, et al. "OceanStore: An Architecture for Global-Scale Persistent Storage" ASPLOS 2000, Cambridge, Massachusetts (2000).
Roy Goldman, Et al. "From SEmistructured Data to XML: Migrating the Lore Data Model And Query Language" (1999).

* cited by examiner

EDITING AND CONFIGURING DEVICE

TECHNICAL FIELD

The subject invention relates to industrial control systems and, more particularly, to enabling utilization of legacy devices when updating an industrial control system data model.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

As can be noted from the above, data associated with conventional industrial controllers is created, delivered, and/or stored with a flat namespace data structure. In other words, all that can be discerned by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Furthermore, updating data structures of controllers is associated with another array of implementation problems. For instance, some legacy controllers or other devices may not be associated with sufficient memory and/or processing power to support an updated application, and it is not cost effective for a company to replace every controller within an enterprise. Therefore, not only will multiple copies of data be existent within an industrial automation environment, but multiple copies of disparately structured data will be existent upon a network. Applications may require disparate mapping modules to enable mapping between controllers associated with first and second architectures. Thus, simply updating an architecture of controllers does not alleviate current deficiencies associated with industrial controllers in an industrial automation environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate programming at least one of a controller and an industrial process within an industrial automation environment. A programming assist component can enhance programmability within industrial automation devices by enabling a programmable logic controller to be programmed according to a hierarchy of an industrial automation environment (e.g., an enterprise, a site, a line, an area, a machine, etc.). A naming convention for a variable and/or automation device can relate to the physical hierarchy of the industrial automation environment. For example, the physical hierarchy of the industrial automation environment can be indicative of a factory-level, a cell-level, a subcell level, input and outputs within each subcell, and the like.

In accordance with one aspect of the claimed subject matter, the programming assist component can program and/or modify an industrial process by traversing the hierarchy in a desirable manner. Moreover, the programming assist component can recognize the location of a device and/or logical variable within the industrial automation environment (e.g., and the location of other controllers in the above defined hierarchy) based at least in part upon the naming convention and the hierarchical structure associated therewith.

In accordance with another aspect of the claimed subject matter, the programming assist component can include an edit component that creates and/or modifies a tag, name and/or reference for a device and/or logical variable related to the PLC 204 without a physical address (e.g., a network address, an Internet protocol (IP) address, etc.) for such device and/or logical variable. In addition, the programming assist component can further include a configure component that provides configuration of devices and/or variables. For example, the configure component can allow the creation of all tag names, data models, and hierarchies without any information related to the physical location of each input and/or output. Furthermore, the configure component provides offline configuration of devices.

In accordance with another aspect of the innovation described herein, the programming assist component can utilize a security component that provides security at a granular level and/or global manner based at least in part upon the hierarchically structured data model with a hierarchical naming convention. In particular, the security component can define security, authorization, and/or privileges in accordance with the physical hierarchy of the industrial automation environment, wherein sectors and/or portions of the environment can be associated to a specific security level. The programming assist component can further utilize at least one of a log component (e.g., that tracks at least one data manipulation), a search component (e.g., that provides querying of data within the industrial automation environment), a bridge component (e.g., that provides network capability), and a translator component (e.g., that formats instructions from a legacy format into a suitable format for the hierarchically structured data model and vice versa). In other aspects of the claimed subject matter, methods are provided that facilitate programming at least one of a controller and an industrial process within an industrial automation environment.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
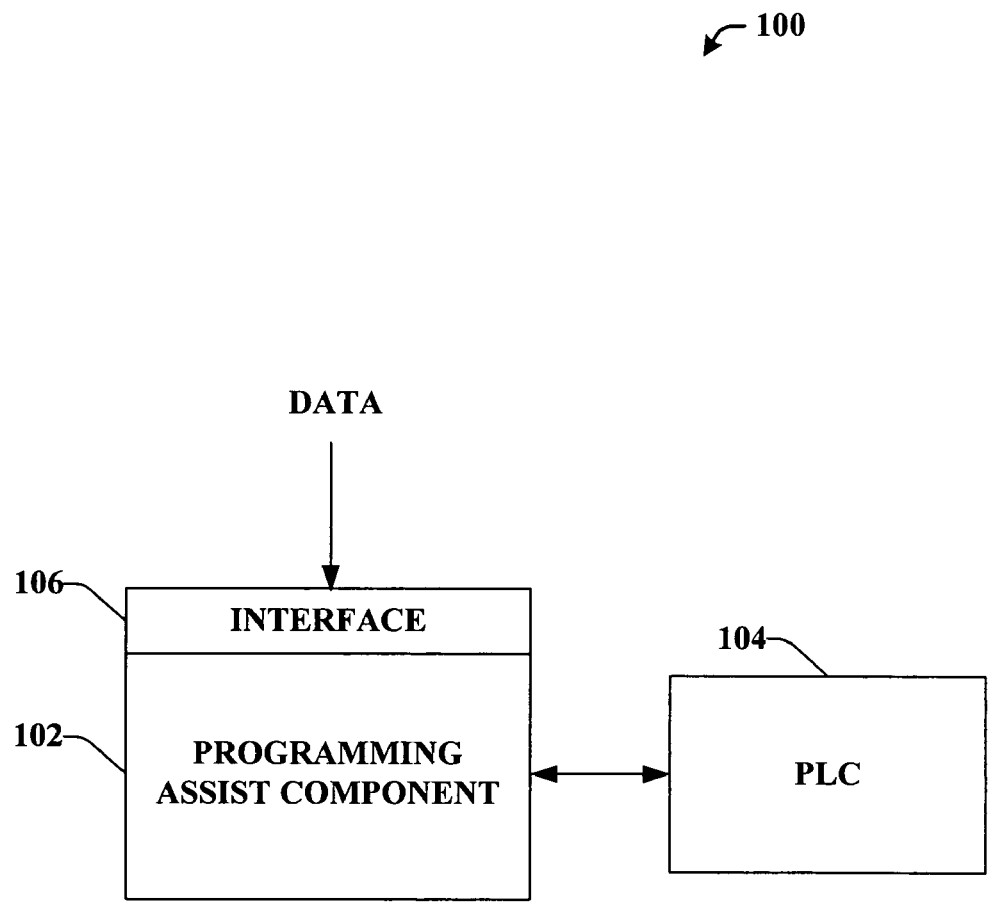
FIG. 1 illustrates a block diagram of an exemplary system that facilitates programming a controller and/or an industrial process utilizing a naming convention that relates to a physical hierarchy of an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates programming a controller and/or an industrial process utilizing a naming convention that relates to a physical hierarchy of an industrial automation environment. A programming assist component 102 enhances programmability within industrial automation devices by enabling a programmable logic controller (herein referred to as the "PLC") 104 to be programmed according to a hierarchy of an industrial automation environment (e.g., a plant, factory, manufacturing facility, etc.). The hierarchy of an industrial automation environment can be based at least in part upon a hierarchically structured data model. In one particular example, the hierarchical data model can be modeled after ISA_S88, ISAS95, and/or a combination thereof. It is understood, however, that any manner of hierarchically configuring a factory can be utilized in connection with modeling. The programming assist component 102 can receive data via an interface 106 (discussed infra), wherein the data can be instructions related to the programming of the PLC 104. For instance, the interface 106 can facilitate receipt of computer related instructions based at least in part upon a user input.

The programming assist component 102 can enhance programmability by utilizing a naming convention, wherein the naming convention for a variable and/or automation device can relate to a physical hierarchy of the industrial automation environment. For example, the physical hierarchy of the industrial automation environment can be indicative of a factory-level, a cell-level, a subcell level, input and outputs within each subcell, and the like. In one example, the physical hierarchy of the industrial automation environment can be enterprise, plant, site, cell, machine, automation device.

It is to be appreciated that the automation device can be, but is not limited to, a roller, a station, a welder, a scanner, a belt conveyor, a pump, a press, a fan, a photo eye, etc., or any other suitable device utilized in automation systems. Furthermore, the automation device can be controlled by the PLC 104. It is to be appreciated that the PLC 104 can contain software components and hardware components having inputs and/or outputs that can be utilized in connection with automating an industrial manufacturing device/process. In addition, it is to be understood that the programming assist component 102 can enhance programmability for a plurality of PLC's, and for the sake of brevity throughout the subject innovation, a single PLC 104 is depicted but the claimed subject matter is not so limited.

Moreover, the programming assist component 102 can provide the programming of the PLC 104 in a "top down" manner. The programming assist component 102 enhances programmability of the PLC 104 in accordance with a common data model that represents a hierarchical structure of the industrial automation environment. A tag (e.g., an input and/or output of a PLC, including physical and virtual) can then utilized by the PLC 104, without a specific definition and/or a definition that is downloaded to the PLC 104. In contrast, conventional process developers required defining tags of a PLC first. The definitions were then downloaded to a PLC, and then programming can be undertaken utilizing such tag definitions. Thus, in contrast, the programming assist component 102 can program and/or modify an industrial process by traversing the hierarchy in a desirable manner. The programming assist component 102 can thus provide offline programming of the PLC 104 that can include, but is not limited to, editing the naming convention (e.g., including variables, automation device names, etc.), configuring (e.g., creating tag references, data models, hierarchy, etc. without knowledge where each input output point physically resides), simulation of industrial processes, etc.

In addition, the programming assist component 102 can allow a user to program the relationship between a device (e.g., a sensor) and other logical variables, and generate a reporting event and specific data structures on the PLC 104. For example, the reporting event can be, but is not limited to, "paint operation on the car was successfully completed in paint cell number 3." Conventional PLCs (and their programming environments) are incapable of generating such events for application programs since the conventional PLC does not have any location awareness and the only type of data that it deals with are sensor and actuator signals or "tags." Utilizing the hierarchically structured data model and the programming assist component 102, the PLC 104 can be made aware of its location in a hierarchy, material flow, quality metrics, scheduling data, etc., and eliminate the need for another "layer" of software that collects sensor/actuator data from the PLC 104 and relates this data to "business intelligence" about the cell that the PLC 104 is controlling. Such data can be stored on, for example, the PLC to maintain a history of the process conditions, and directly addressed/retrieved by other business applications.

In another example, the programming assist component 102 can recognize a completion and/or a portion of completion of an industrial process at an management execution system (MES) layer (e.g., in Logix). Moreover, the programming assist component 102 can implement a data package that is automatically completed and/or configured in a manner that is readily understood by designated devices/systems. It is to be appreciated and understood that the data package can be formatted in accordance with a common data model that is based upon an industry standard, such as ISA_S88, ISAS95, etc.

Moreover, the system 100 can include any suitable and/or necessary interface component 106, which provides various adapters, connectors, channels, communication paths, etc. to integrate the programming assist component 102 into virtually any operating and/or database system(s). In addition, the interface component 106 can provide various adapters, connectors, channels, communication paths, etc., that provide for interaction with the programming assist component 102.

Figure 2:
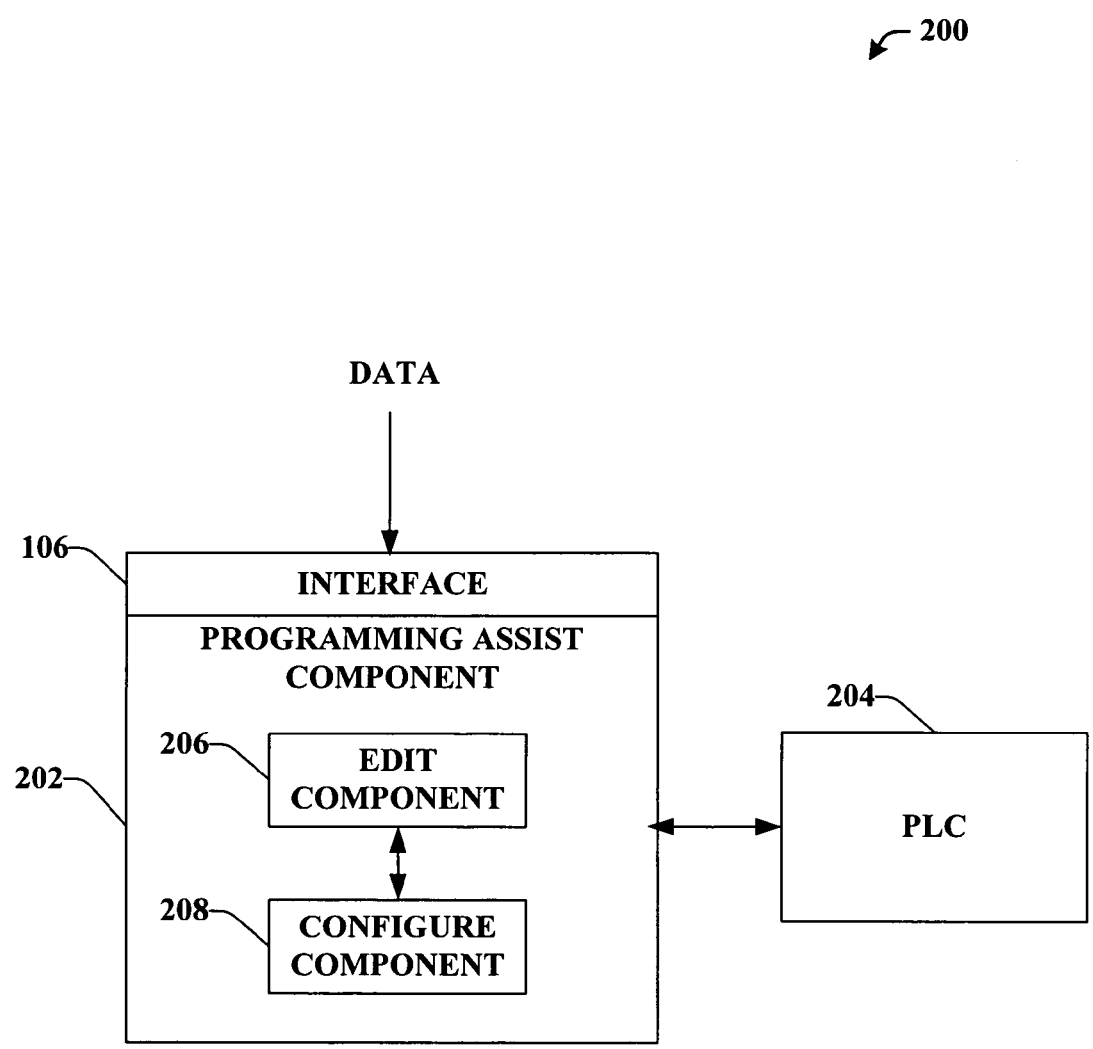
FIG. 2 illustrates a block diagram of an exemplary system that facilitates editing and/or configuring of at least one device name that represents a physical device within the physical hierarchy of an industrial automation environment.

FIG. 2 illustrates a system 200 that facilitates editing and/or configuring of at least one device name that represents a physical device within the physical hierarchy of an industrial automation environment. A programming assist component 202 can enhance the programmability of a PLC 204 by utilizing a naming convention wherein a reference and/or name can represent the physical device within the physical hierarchy of an industrial automation environment (e.g., a plant, factory, manufacturing facility, etc.). The programming assist component 202 can provide a "top-down" programming environment, wherein a data model based at least in part upon the physical hierarchy of the industrial automation environment can be traversed to program and/or modify an industrial process. Furthermore, the programming assist component 202 can recognize the location of a device and/or logical variable within the industrial automation environment (e.g., and the location of other controllers in the above defined hierarchy) based at least in part upon the naming convention and the hierarchical structure associated therewith. It is to be appreciated that the programming assist component 202, the PLC 204, and the interface 106 can be substantially similar to the programming assist component 102, the PLC 104, and the interface 106 of FIG. 1 respectively.

The programming assist component 202 can include an edit component 206 that creates and/or modifies a tag, name and/or reference for a device and/or logical variable related to the PLC 204 without a physical address (e.g., a network address, an Internet protocol (IP) address, etc.) for such device and/or logical variable. In other words, the edit component 206 can create and/or modify a tag within an industrial automation environment and the physical location of the tag within the hierarchical structure based at least in part upon the naming convention implemented. Thus, the naming convention includes the physical hierarchy within the tag, reference and/or name of the device and/or logical variable. For example, a first photo eye on controller 5, in cell A, in the Smithville Plant that is for packaging associated with a Chip Factory can be referenced as "ChipFactory/Packaging/SmithvillePlant/CellA/Controller5/photoeye1." By utilizing such a naming convention, tags, names, and/or references need not be unique, and programming can be more generalized, code can be reused, and code can be more descriptive as well as more informative. The edit component 206 can create the reference and/or name and further allow any modification to such tag, reference and/or name.

The programming assist component 202 can further include a configure component 208 that provides configuration of devices and/or variables. For example, the configure component 208 can allow the creation of all tag names, data models, hierarchies, without any information related to the physical location of each input and/or output. Furthermore, the configure component 208 provides offline configuration of devices. In conventional systems and/or methods, all devices within the industrial automation environment would need to be connected to a controller for configuration. In contrast, the configuration component 208 provides configuration of devices and/or offline configuration of devices, wherein the devices need not be connected to the PLC 204, or be in existence in the industrial automation environment. Thus, the configure component 208 can create a program for the PLC 204 utilizing the naming convention (discussed supra) and writing and debugging a program without "binding" the devices to physical addresses on the PLC 204. With the offline creation of a program, simulations can be run to verify the accuracy of such programs offline. Once verified and accurate, the program can be downloaded to the controller.

For example, a developer can utilize generic names for all tags and write a simulation program offline, wherein the simulator can create a program that is copied to software. The names can then be mapped (e.g., in conjunction with the naming convention discussed above) to the hierarchical representations and downloaded to the PLC 204 and/or multiple PLC's substantially similar to PLC 204. After completion of the program, simulations can be run to verify the accuracy of the program while being offline. The above example illustrates the "top-down" programming manner implemented by the programming assist component 202.

Figure 3:
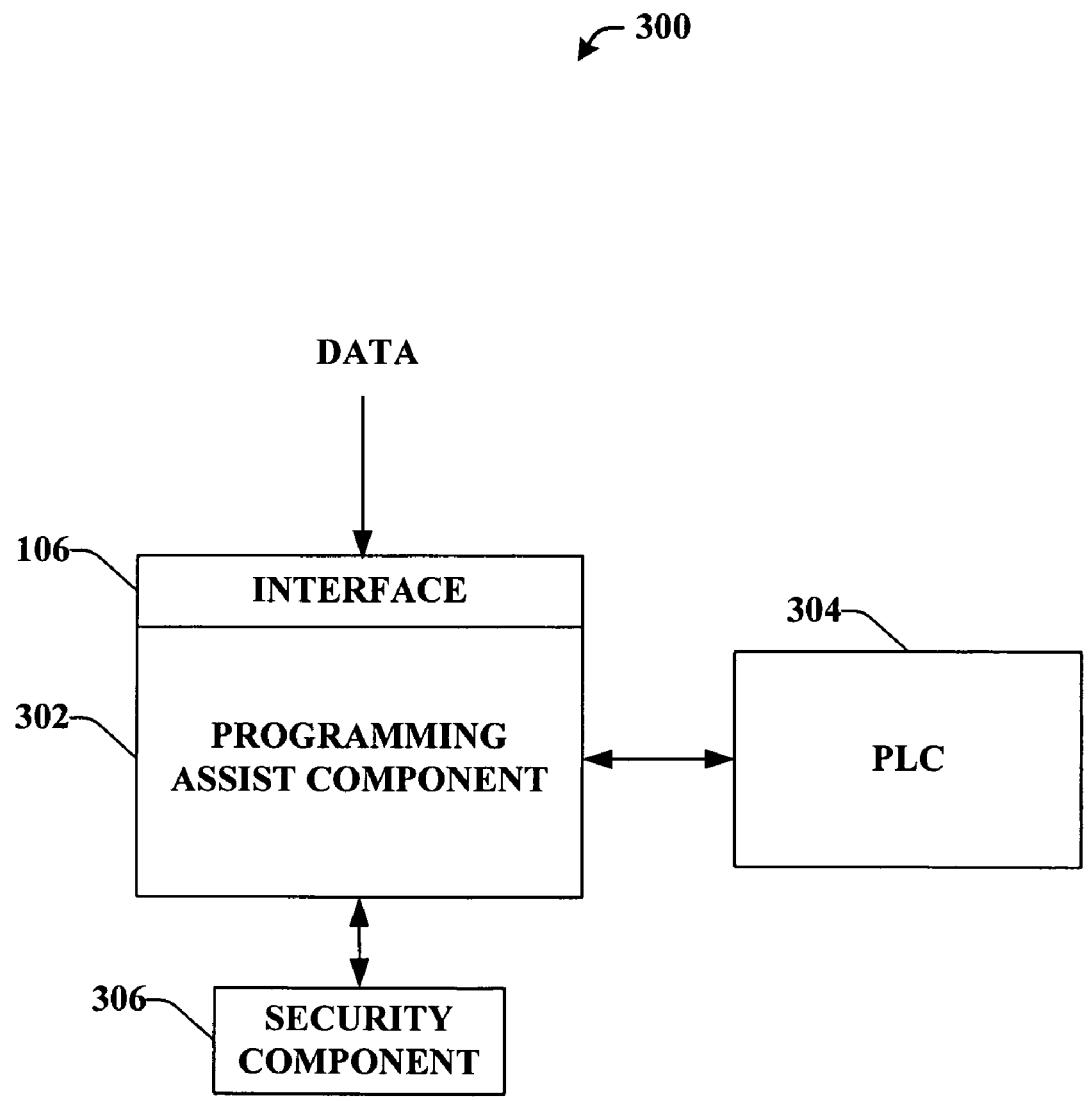
FIG. 3 illustrates a block diagram of an exemplary system that facilitates securing the programming of a naming convention that relates to a physical hierarchy of an industrial automation environment.

FIG. 3 illustrates a system 300 that facilitates securing the programming of a naming convention that relates to a physical hierarchy of an industrial automation environment. A programming assist component 302 enhances programmability within industrial automation devices by enabling a PLC 304 to be programmed according to a hierarchy of an industrial automation environment (e.g., a plant, factory, manufacturing facility, etc.), wherein the hierarchy utilizes a particular naming convention that relates variables and/or devices to physical industrial automation hierarchy. For example, the physical hierarchy of the industrial automation environment can be indicative of a factory-level, a cell-level, a subcell level, input and outputs within each subcell, and the like. Moreover, the programming assist component 302 can provide the programming of the PLC 304 in a "top down" manner. Furthermore, the programming assist component 302 can recognize the location of a device and/or logical variable within the industrial automation environment (e.g., and the location of other controllers in the above defined hierarchy) based at least in part upon the naming convention and the hierarchical structure associated therewith. It is to be appreciated that the programming assist component 302, the PLC 304, and the interface 106 can be substantially similar to components, controllers, and interfaces described in previous figures.

The programming assist component 302 can utilize a security component 306 that provides security at a granular level and/or global manner based at least in part upon the hierarchically structured data model with a hierarchical naming convention. In particular, the security component 306 can define security, authorization, and/or privileges in accordance with the physical hierarchy of the industrial automation environment, wherein sectors and/or portions of the environment can be associated to a specific security level. For instance, a particular subcell can be a first security level with distinct security authorizations and/or privileges, while a cell (which includes at least the subcell) can have a second security level with disparate security authorizations and/or privileges. It is to be appreciated that there can be various levels of security, with numerous areas associated with each level and that the subject innovation is not limited to the above example. Moreover, the security component 306 provides granular security and/or privileges to the system 300, wherein at least a portion of the hierarchically structured data model is protected. It is to be appreciated that security component 306 can be a stand-alone component, incorporated into the programming assist component 302, and/or any combination thereof.

Figure 4:
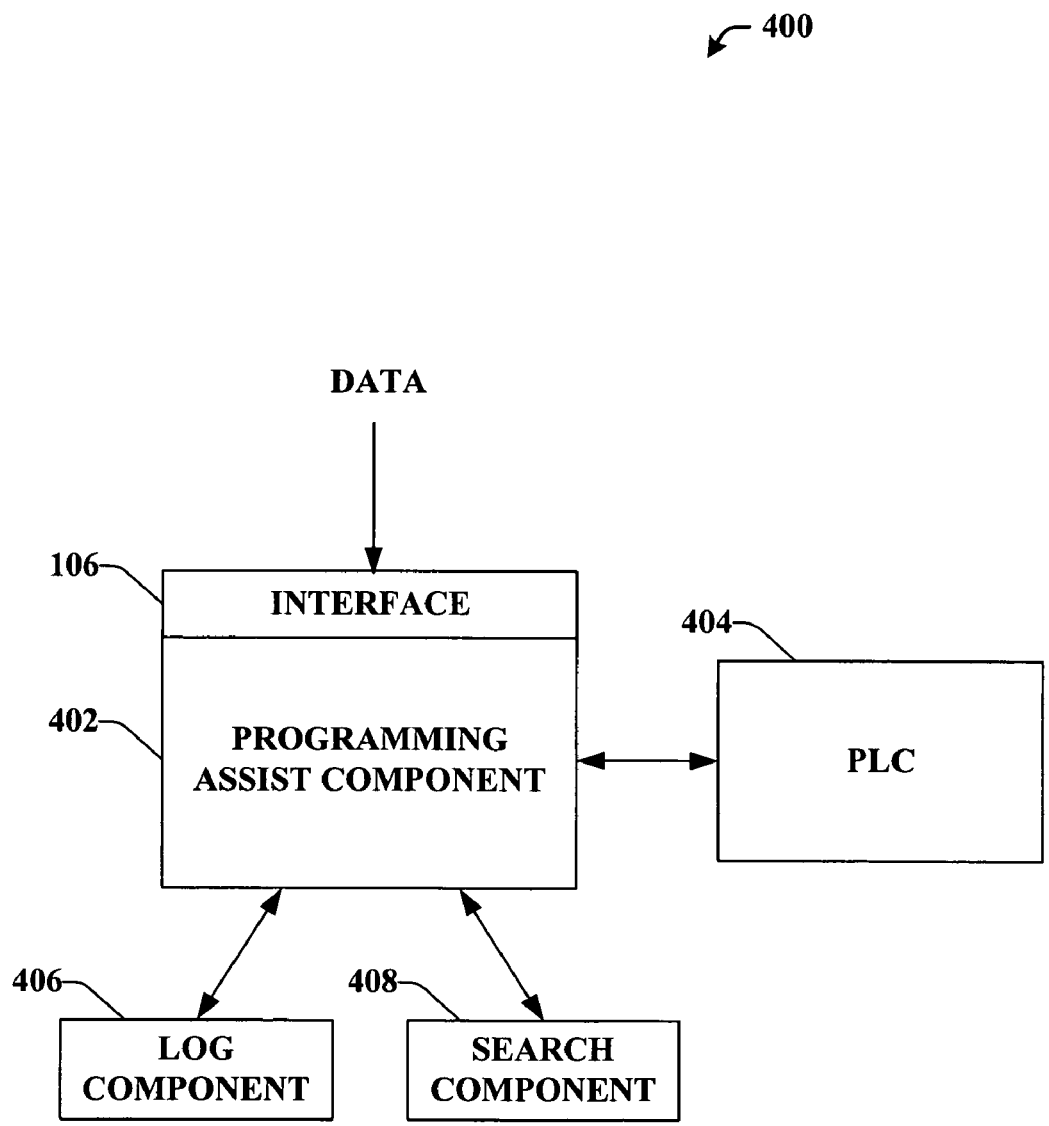
FIG. 4 illustrates a block diagram of an exemplary system that facilitates programming a controller and/or an industrial process utilizing a naming convention that relates to a physical hierarchy of an industrial automation environment.

FIG. 4 illustrates a system 400 that facilitates programming a controller and/or an industrial process utilizing a naming convention that relates to a physical hierarchy of an industrial automation environment. A programming assist component 402 can enhance programmability of a PLC 404 by programming in accordance with a hierarchically structured data model, wherein a device and/or variable can be referenced and/or named based upon the physical location within the industrial automation environment. The programming assist component 402 can facilitate programming associated with the PLC 404 by providing offline configuration, editing, simulation, security, top-down programming, etc. in accordance with the hierarchically structured data model and naming convention. It is to be appreciated that the programming assist component 402, the PLC 404, and the interface 106 can be substantially similar to the previously described components, controllers, and/or interfaces.

The programming assist component 402 can utilize a log component 406 that tracks programming related manipulations. It is to be appreciated that log component 406 can be a stand-alone component, incorporated into the programming assist component 402, and/or any combination thereof. For example, if a user A utilizes the programming assist component 402 to edit a device and/or variable name, the log component 406 can track the user (e.g., via IP address, network address, user name, computer name, etc.), the date and time, and the data change implemented. The log component 406 can log various aspects related to data manipulations such as, but not limited to, versions of hierarchically structured data models, edits to names, configuration settings, security settings, time stamps related to modifications, dates related to manipulations, user names and/or computer names related to data changes, etc. Moreover, the log component 406 can store the logged entries in a data store (not shown). The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

The programming assist component 402 can further implement a search component 408 that facilitates querying any data associated with the system 400. The search component 408 allows a user to query to system 400 in relation to code, names, variables, devices, locations, hierarchically structured data models, program references, simulators, etc. For instance, a user can query the system 400 utilizing the search component 408 to find results associated with conveyors within the Localville, Ohio plant. In another example, the search component 408 can allow a developer to provide results associated with all devices within sector 5, cell 6, and controlled by controller A. It is to be appreciated that a plurality of searches and/or queries can be implemented by the search component 408 and the above examples are not to be limiting on the claimed subject matter. Moreover, it is to be appreciated that the search component 408 is depicted as a stand-alone component, but the search component 408 can be incorporated into the programming assist component 402, a stand-alone component, and/or any combination thereof.

Figure 5:
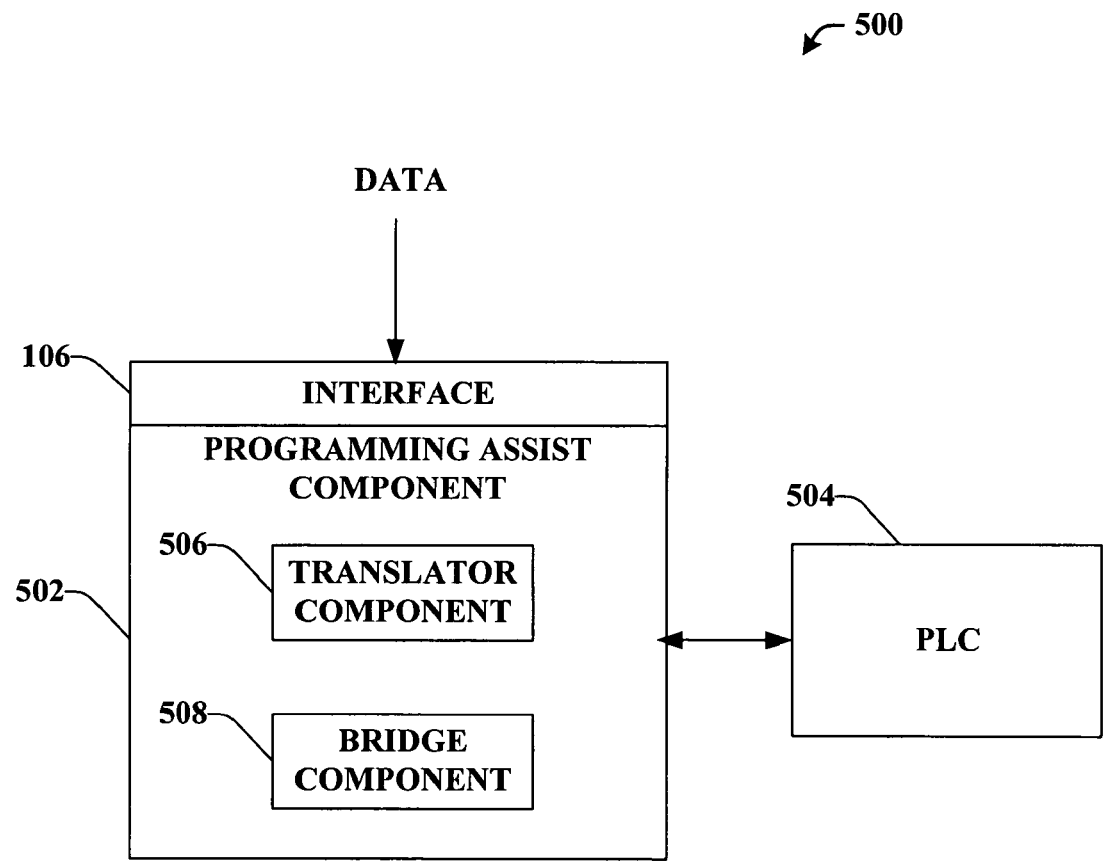
FIG. 5 illustrates a block diagram of an exemplary system that facilitates programming variable references in accordance with a hierarchy naming convention based on a physical hierarchy of an automation environment as in ISAS95, ISA_S88 standards.

FIG. 5 illustrates a system 500 that facilitates programming variable references in accordance with a hierarchy naming convention based on a physical hierarchy of an industrial automation environment as in ISAS95, ISA_S88 standards. A programming assist component 502 can enhance programmability of a PLC 504 by programming in accordance with a hierarchically structured data model that references a device and/or variable based at least in part upon the location within the industrial automation environment. The programming assist component 502 provides enhanced programming in connection with the PLC 504 by providing offline configuration, editing, simulation, security, top-down programming, etc. in accordance with a hierarchically structured data model and naming convention. It is to be appreciated that the programming assist component 502, the PLC 504, and the interface 106 can be substantially similar to the previously described components, controllers, and/or interfaces.

The programming assist component 502 can include a translator component 506 that can interpret various computer instructions into a suitable and/or comparable format that is compatible with the hierarchically structured data model. For instance, the programming assist component 502 can be implemented into a system that contains legacy devices, controllers, and the like that utilize computer instructions not related to the hierarchically structured data model and the naming convention based on the physical location within the industrial automation environment. Thus, the translator component 506 can interpret and/or translate such legacy instructions such that the instructions can be compatible with the hierarchically structured data model. In another example, the translator component 506 can provide reverse translation, wherein instructions related to the hierarchically structured data model can be interpreted into any suitable legacy instructions. Although depicted as incorporated into the programming assist component 502, it is to be appreciated that the translator component 506 can be a stand-alone component, incorporated into the programming assist component 502, and/or any combination thereof.

The programming assist component 502 can further include a bridge component 508 that facilitates networking within the industrial automation environment. In other words, the bridge component 508 can act as a network bridge. Thus, data carried by disparate networks can be manipulated so that it conforms to a common network. Accordingly, the bridge component 508 can recognize a network protocol associated with received instructions related to the PLC 504 and perform operations to convert such data so that it conforms to a pre-defined protocol. Upon such conversion, a mapping can be employed to convert the data so that it conforms to the hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP).

Figure 6:
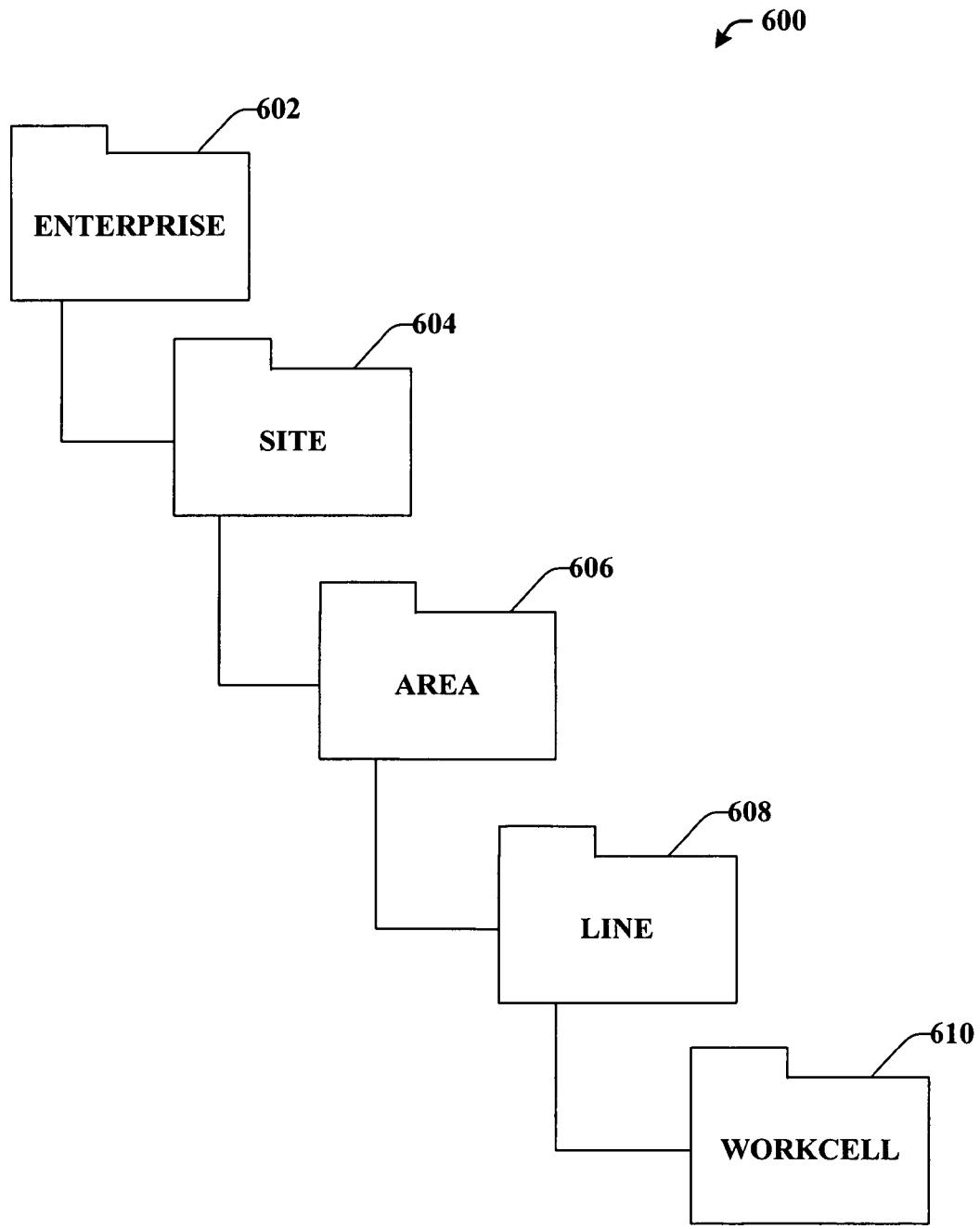
FIG. 6 illustrates a block diagram of an exemplary data structure that represents a hierarchical structure of an industrial automation system.

FIG. 6 illustrates a data structure 600 that represents a hierarchical structure of an industrial automation. For example, the data model can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs can become more aware of data associated therewith. Furthermore, the hierarchy 600 can be customized by an owner of such hierarchy. For instance, more granular objects/levels can be defined within the hierarchy 600.

Figure 7:
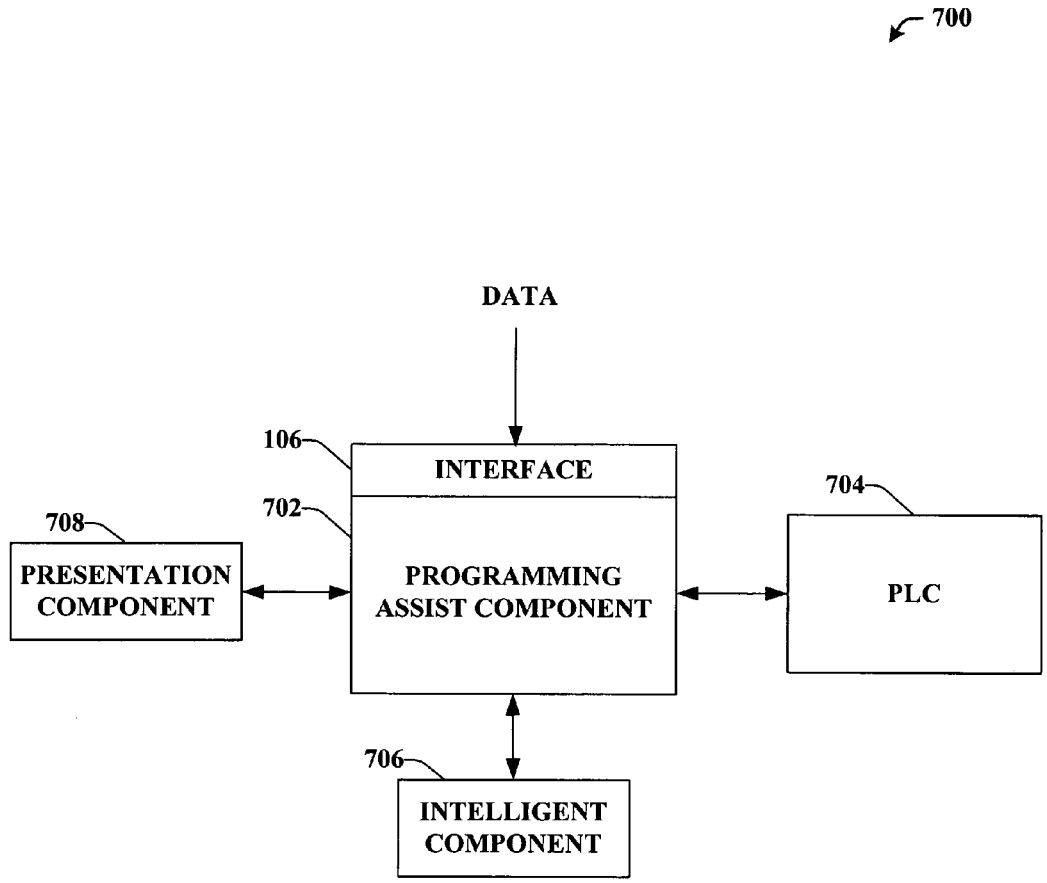
FIG. 7 illustrates a block diagram of an exemplary system that facilitates editing and/or configuring of at least one device name that represents a physical device within the physical hierarchy of an industrial automation environment.

FIG. 7 illustrates a system 700 that employs intelligence to facilitate editing and/or configuring of at least one device name that represents a physical device within the physical hierarchy of an industrial automation environment. The system 700 can include a programming assist component 702, a PLC 704, and an interface 106 that can all be substantially similar to respective components, controllers, and interfaces described in previous figures. The system 700 further includes an intelligent component 706. The intelligent component 706 can be utilized by the programming assist component 702 to facilitate programming a naming convention that relates to a physical hierarchy of an industrial automation environment. For example, the intelligent component 706 can infer the naming convention for devices and/or variables, the hierarchically structured data model, verification of programs and/or processes, etc.

Moreover, the intelligent component 706 can facilitate utilizing a consumption of a material and the status of such material to an operator role and/or position. For example, the intelligent component 706 can infer the consumption of raw materials utilized in the production of a particular industrial automation process and/or system. Such inference can be based at least in part upon historic data related to the consumption of materials, status and/or supply of materials, etc. Moreover, such consumption and status of materials can be communicated to an operator and/or the role of an operator.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 708 can provide various types of user interfaces to facilitate interaction between a user and any component coupled to the programming assist component 702. As depicted, the presentation component 708 is a separate entity that can be utilized with the programming assist component 702. However, it is to be appreciated that the presentation component 708 and/or similar view components can be incorporated into the programming assist component 702 and/or a stand-alone unit. The presentation component 708 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the programming assist component 702.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
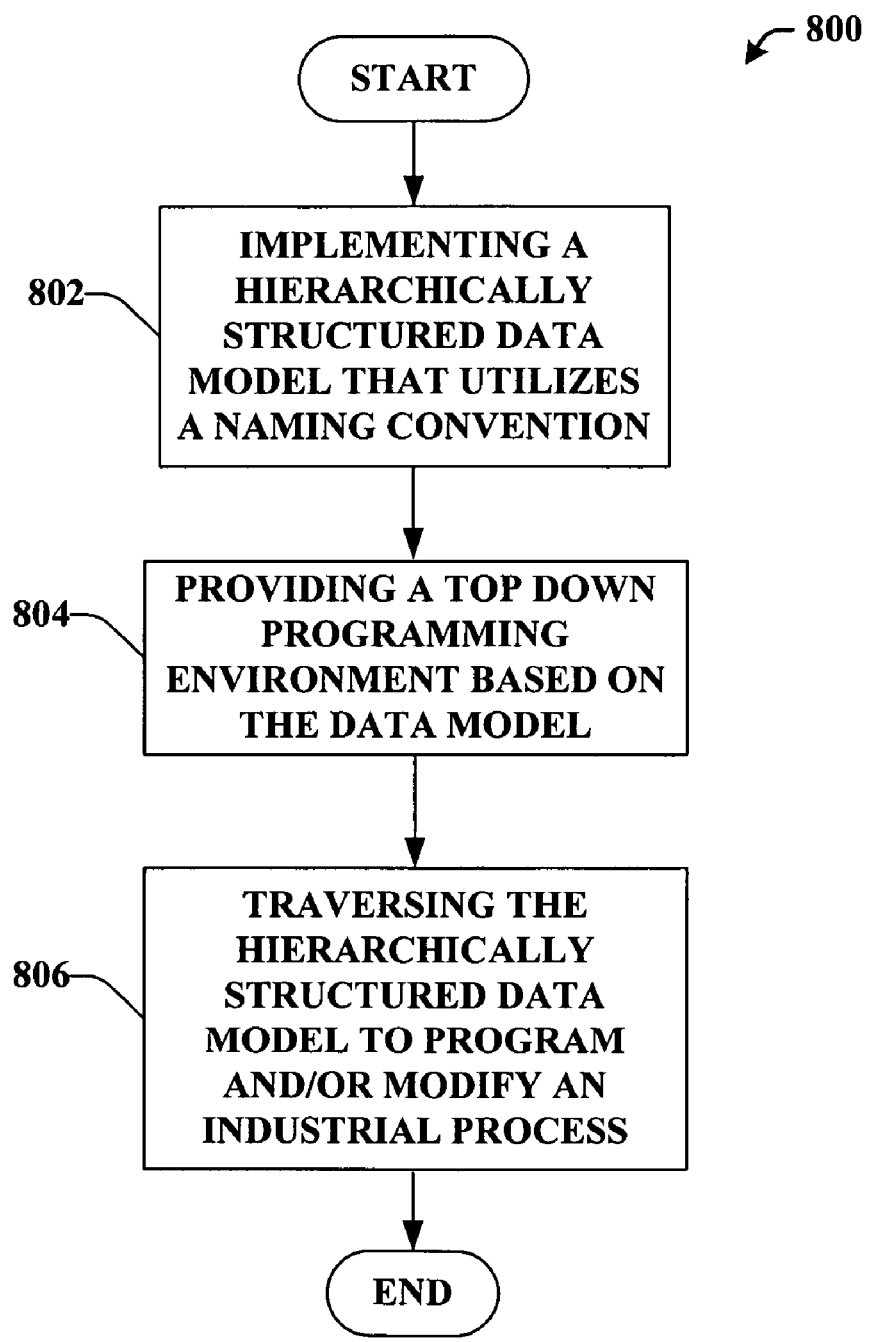
FIG. 8 illustrates an exemplary methodology for programming a controller and/or an industrial process utilizing a naming convention that relates to a physical hierarchy of an industrial automation environment.
Figure 9:
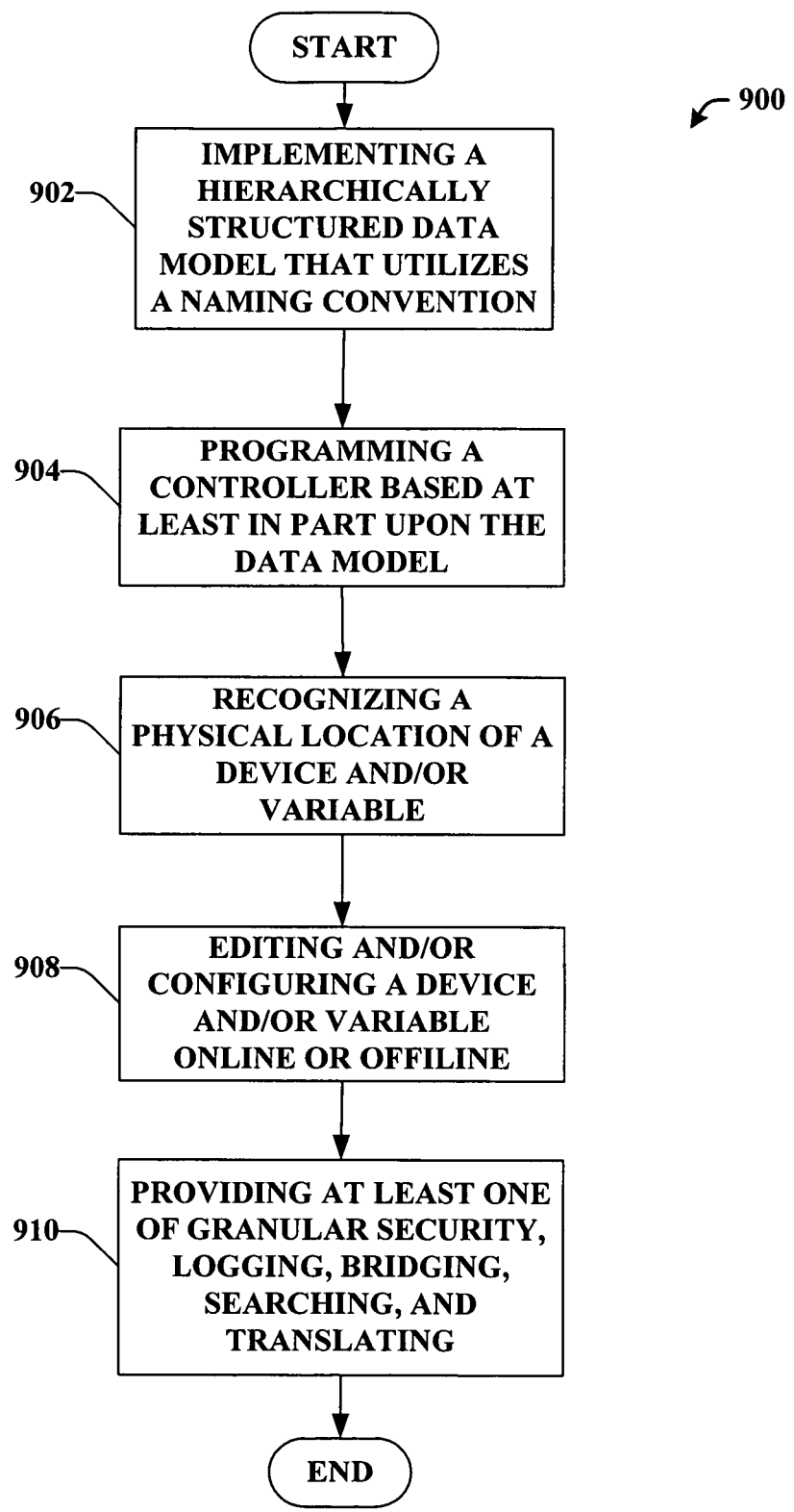
FIG. 9 illustrates an exemplary methodology that facilitates editing and/or configuring of at least one device name that represents a physical device within the physical hierarchy of an industrial automation environment.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology 800 is illustrated for programming a controller and/or an industrial process utilizing a naming convention that relates to a physical hierarchy of an industrial automation environment. At reference numeral 802, a hierarchically structured data model can be implemented that utilizes a naming convention. The naming convention can represent a device and/or variable, wherein the representation of such device and/or variable includes the physical location within the industrial automation environment. It is to be appreciated that the automation device can be, but is not limited to, a roller, a station, a welder, a scanner, a belt conveyor, a pump, a press, a fan, etc., or any other suitable device utilized in automation systems. Furthermore, the device can be controlled by a PLC. It is to be appreciated that the PLC can contain software components and hardware components having inputs and/or outputs that can be utilized in connection with automating an industrial manufacturing device/process.

For example, the physical hierarchy of the industrial automation environment can be indicative of a factory-level, a cell-level, a subcell level, input and outputs within each subcell, and the like. Thus, the naming convention includes the physical hierarchy within the tag, reference and/or name of the device and/or logical variable. For example, a first photo eye on controller 5, in cell A, in the Smithville Plant that is for packaging associated with a Chip Factory can be referenced as "ChipFactory/Packaging/SmithvillePlant/CellA/Controller5/photoeye 1."

At reference numeral 804, a top down programming environment can be provided based at least in part upon the hierarchically structured data model. The top down programming method enhances programmability of the PLC in accordance with the common data model that represents a hierarchical structure of the industrial automation environment. A tag (e.g., an input and/or output of a PLC, including physical and virtual) can be utilized by the PLC, without a specific definition and/or a definition that is downloaded to the PLC.

Continuing at reference numeral 806, the hierarchically structured data model can be traversed to program and/or modify an industrial process. Thus, offline programming (e.g., by implementing the top down programming environment) is provided for the PLC that can include, but is not limited to, editing the naming convention (e.g., including variables, automation device names, etc.), configuring (e.g., creating tag references, data models, hierarchy, etc. without knowledge where each input output point physically resides), simulation of industrial processes, etc.

FIG. 9 illustrates a methodology 900 that facilitates editing and/or configuring of at least one device name that represents a physical device within the physical hierarchy of an industrial automation environment. At reference numeral 902, a hierarchically structured data model can be implemented that utilizes a naming convention. The naming convention can represent a device and/or variable, wherein the representation of such device and/or variable includes the physical location within the industrial automation environment. For example, the physical hierarchy of the industrial automation environment can be indicative of a factory-level, a cell-level, a subcell level, input and outputs within each subcell, and the like. At reference numeral 904, a controller can be programmed based at least in part upon the hierarchically structured data model. For example, the programming of a controller and/or the programming and/or modification of an industrial process can be in a top down manner.

At reference numeral 906, the implementation of the hierarchically structured data model and programming techniques allow the recognition of a physical location of a device and/or variable within the industrial automation environment. For instance, a developer and/or programmer can determine the physical location of a device based at least in part upon the naming convention utilized. Thus, controllers, program editors, etc. can recognize the physical location of a device and/or variable within the industrial automation environment.

Referring to reference numeral 908, editing and/or configuring of a device and/or variable can be achieved while online or offline. The editing of a device and/or variable allows the creation and/or modification of a tag, name and/or reference for a device and/or logical variable related to the PLC without a physical address (e.g., a network address, an Internet protocol (IP) address, etc.) for such device and/or logical variable. In other words, the a tag can be utilized within an industrial automation environment and the physical location of the tag within the hierarchical structure based at least in part upon the naming convention implemented. Moreover, the configuration of devices and/or variables can be implemented. For example, the creation of all tag names, data models, hierarchy, without any information related to the physical location of each input and/or output can be provided.

At reference numeral 910, at least one of the following can be provided: granular security, logging, bridging between disparate networks, searching and/or querying, and translation between disparate programming languages. Granular security can be implemented based at least in part upon the levels sectored from the physical layout of the industrial automation environment. Moreover, logging can be provided such that any data change and/or manipulation can be logged and/or tracked. Various bridging techniques can be utilized to seamlessly integrate into disparate networking systems. Furthermore, queries and searches can be provided and fulfilled such that the data model, references and/or names, processes, programs can be searched. In addition, the translation of legacy code can be modified to be compatible to the hierarchically structured data model code and vice versa.

Figure 10:
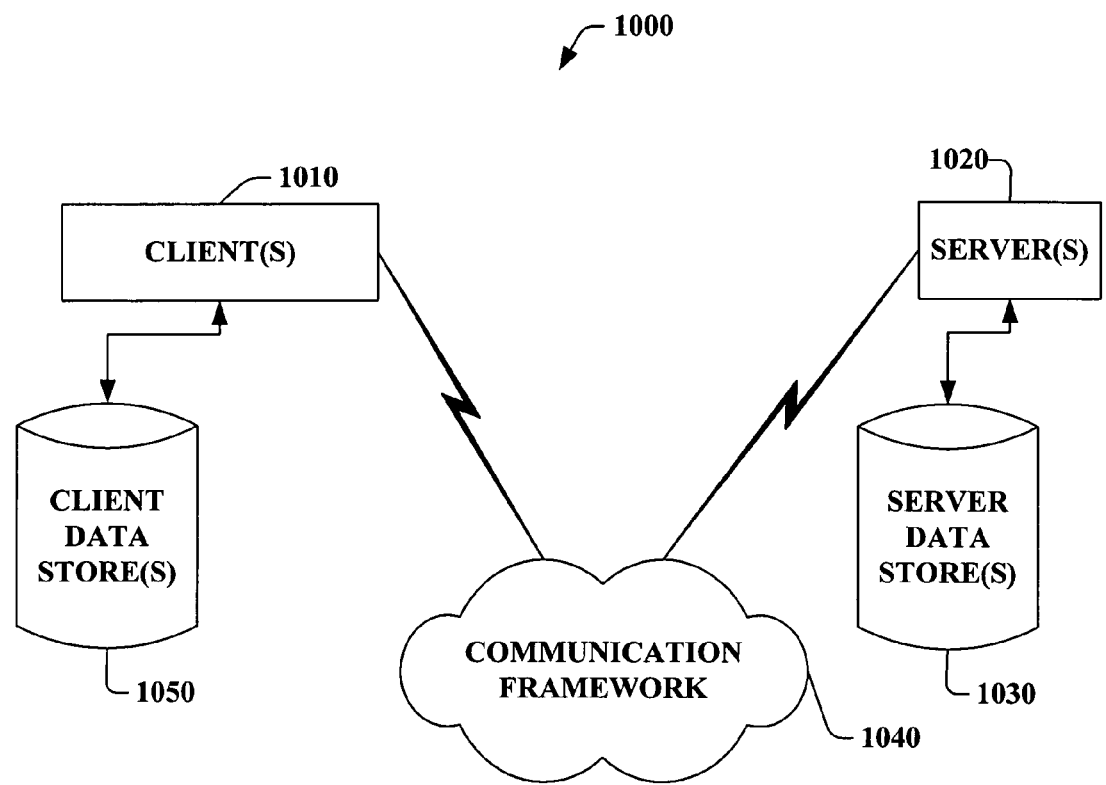
FIG. 10 illustrates an exemplary networking environment, wherein the novel aspects of the claimed subject matter can be employed.
Figure 11:
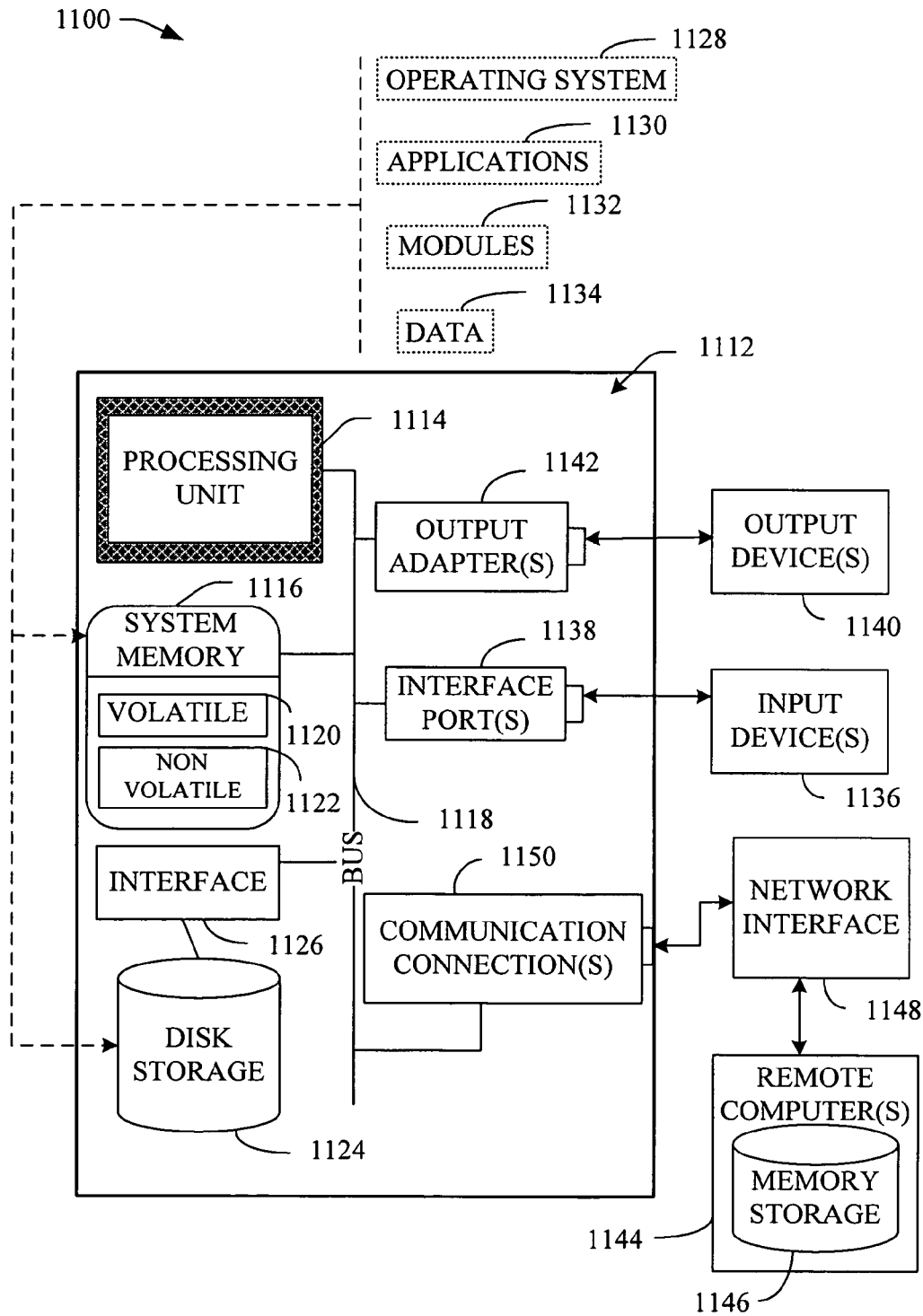
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method that facilitates programming within an industrial automation environment, comprising:
employing one or more processors executing computer executable instructions embodied on one or more computer readable storage mediums to perform the following acts:
implementing a hierarchically structured data model that utilizes a naming convention, the hierarchically structured data model represents a physical hierarchical location within an industrial automation environment of at least one of a device, a tag, or a variable, the naming convention is based upon a hierarchy of the hierarchical structured data model and is indicative of position in the hierarchy;
providing a programming environment based at least in part upon the hierarchically structured data model;
traversing the hierarchically structured data model to program one or more names in an industrial process according to the naming convention;
programming a controller associated with the industrial process based at least in part upon the traversed hierarchically structured data model, wherein programming the controller includes assigning the one or more names to at least one of the device, the tag, or the variable; and
recognizing a physical location of at least one of the device, the tag, or the variable without a binding to the controller based upon the one or more names.

2. The method of claim 1, the physical hierarchical location is indicative of at least a portion of a factory-level, a cell-level, a subcell level, an input within a subcell, or an output within a subcell.

3. The method of claim 1, further comprising at least one of:
modifying at least one of a tag, a name for a device without a physical address, a name for a logical variable without a physical address, a reference for a device without a physical address, or a reference for a logical variable without a physical address; or
creating at least one of a tag, a name for a device without a physical address, a name for a logical variable without a physical address, a reference for a device without a physical address, or a reference for a logical variable without a physical address.

4. The method of claim 1, further comprising offline configuring of at least one of a device or a logical variable within the industrial automation environment.

5. The method of claim 1, further comprising providing authorization at a granular level based at least in part upon the hierarchically structured data model.

6. The method of claim 1, the hierarchically structured data model is based at least in part upon one or more of ISAS95 or ISA_S88.

7. The method of claim 1, further comprising providing at least one of a log, a bridge between disparate networks, a search, or a translation between disparate instructions.

8. A system for programming within an industrial automation environment, comprising:
a processor;
a memory communicatively coupled to the processor, the memory having stored therein computer-executable instructions to implement the system, including:
a hierarchically structured data model that utilizes a naming convention, the hierarchically structured data model represents a physical hierarchical location within an industrial automation environment of at least one of a device, a tag, or a variable, the naming convention is based upon a hierarchy of the hierarchical structured data model and is indicative of position in the hierarchy;
a programming environment based at least in part upon the hierarchically structured data model; and
a programming assist component that traverses the hierarchically structured data model in to program one or more names in an industrial process according to the naming convention, the programming assist component programs a controller associated with the industrial process based at least in part upon the traversed hierarchically structured data model, wherein programming the controller includes assigning the one or more names to at least one of the device, the tag, or the variable, the programming assist component recognizes a physical location of at least one of the device, the tag, or the variable without a binding to the controller based upon the one or more names.

9. The system of claim 8, the physical hierarchical location is indicative of at least a portion of a factory-level, a cell-level, a subcell level, an input within a subcell, or an output within a subcell.

10. The method of claim 9, further comprising a component that provides at least one of a log, a bridge between disparate networks, a search, or a translation between disparate instructions.

11. The system of claim 8, further comprising at least one of:
the programming assist component modifying at least one of a tag, a name for a device without a physical address, a name for a logical variable without a physical address, a reference for a device without a physical address, or a reference for a logical variable without a physical address; or
the programming assist component creating at least one of a tag, a name for a device without a physical address, a name for a logical variable without a physical address, a reference for a device without a physical address, or a reference for a logical variable without a physical address.

12. The system of claim 8, further comprising the programming assist component offline configuring of at least one of a device or a logical variable within the industrial automation environment.

13. The system of claim 8, further comprising a security component providing authorization at a granular level based at least in part upon the hierarchically structured data model.

14. The system of claim 8, the hierarchically structured data model is based at least in part upon one or more of ISAS95 or ISA_S88.

15. A system for programming within an industrial automation environment, comprising:
a processor;
a memory communicatively coupled to the processor, the memory having stored therein computer-executable instructions to implement the system, including:
means for programming in a programming environment based at least in part upon a hierarchically structured data model that traverses the hierarchically structured data model to program one or more names in an industrial process according to the naming convention, wherein the hierarchically structured data model utilizes a naming convention, the hierarchically structured data model represents a physical hierarchical location within an industrial automation environment of at least one of a device, a tag, or a variable, the naming convention is based upon a hierarchy of the hierarchical structured data model and is indicative of position in the hierarchy,
the means for programming programs a controller associated with the industrial process based at least in part upon the traversed hierarchically structured data model, wherein programming the controller includes assigning the one or more names to at least one of the device, the tag, or the variable, and
the means for programming recognizes a physical location of at least one of the device, the tag, or the variable without a binding to the controller based upon the one or more names.

16. The system of claim 15, the physical hierarchical location is indicative of at least a portion of a factory-level, a cell-level, a subcell level, an input within a subcell, or an output within a subcell.

17. The system of claim 15, further comprising at least one of:
the means for programming modifying at least one of a tag, a name for a device without a physical address, a name for a logical variable without a physical address, a reference for a device without a physical address, or a reference for a logical variable without a physical address; or
the means for programming creating at least one of a tag, a name for a device without a physical address, a name for a logical variable without a physical address, a reference for a device without a physical address, or a reference for a logical variable without a physical address.

18. The system of claim 15, further comprising the means for programming offline configuring of at least one of a device or a logical variable within the industrial automation environment.

19. The system of claim 15, further comprising the means providing authorization at a granular level based at least in part upon the hierarchically structured data model.

20. The system of claim 15, the hierarchically structured data model is based at least in part upon one or more of ISAS95 or ISA_S88.

21. The method of claim 15, further comprising means for providing at least one of a log, a bridge between disparate networks, a search, or a translation between disparate instructions.

* * * * *